July 26, 1966  S. H. SMITH, JR  3,262,317

DIFFERENTIAL PRESSURE GAGE

Filed Sept. 30, 1963

INVENTOR
SOMMERS H. SMITH JR.

BY *Richard C. Reed*

ATTORNEY

United States Patent Office 3,262,317
Patented July 26, 1966

3,262,317
DIFFERENTIAL PRESSURE GAGE
Somers H. Smith, Jr., 554 Waterway Drive,
Falls Church, Va.
Filed Sept. 30, 1963, Ser. No. 312,795
3 Claims. (Cl. 73—407)

The invention described herein may be manufactured and used by or for the Government of the United States of America for governmental purposes without the payment of any royalties thereon or therefor.

The present invention relates to differential pressure gages, and more particularly to differential pressure gages having a small space in relation to the system measured.

In prior art devices there is a large chamber within a gage housing in which a diaphragm is centrally mounted thereby inherently creating a dead air space between one wall of the chamber and the diaphragm which must be overcome before a reading will be indicated, thereby creating an undesirable time lag. In certain applications such a time lag is not desired, or could be deadly, especially in an area of highly toxic gases. Further, prior gages used elaborate linkage systems linking the diaphragm deflection and gage dial in order to get a reading.

The present invention is a pressure gage, presenting a very small gas space to be overcome in relation to the system being measured, thereby eliminating an undesirable time lag. Further the linkages required to move the indicating dial or needle are eliminated, since the needle deflection means is directly attached to the diaphragm.

An object of the present invention is to provide an improved diaphragm operated differential pressure gage.

Another object is to provide an improved differential pressure gage which is compact in design.

A further object of the invention is the provision of an improved means for transmitting movement from the diaphragm to a control mechanism.

Still another object is to provide a minimum of air space between the diaphragm and the gage housing.

A final object of the present invention is the provision of a needle pointer mounting and the associated movement mechanism.

Other objects and advantages of the invention will hereinafter become more fully apparent from the following description of the annexed drawings, which illustrate a preferred embodiment and wherein.

The invention is a differential pressure gage having a minimum air space in relation to the system to be measured and having a mechanism attached directly to the diaphragm for moving the pointer in relation to the dial.

Figure 1:
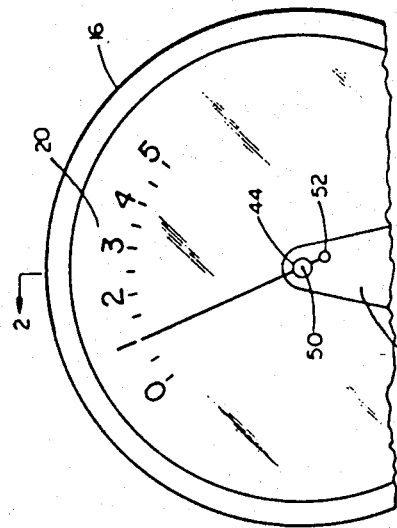
FIG. 1 is a fragmentary plan view according to one embodiment of this invention.
Figure 2:
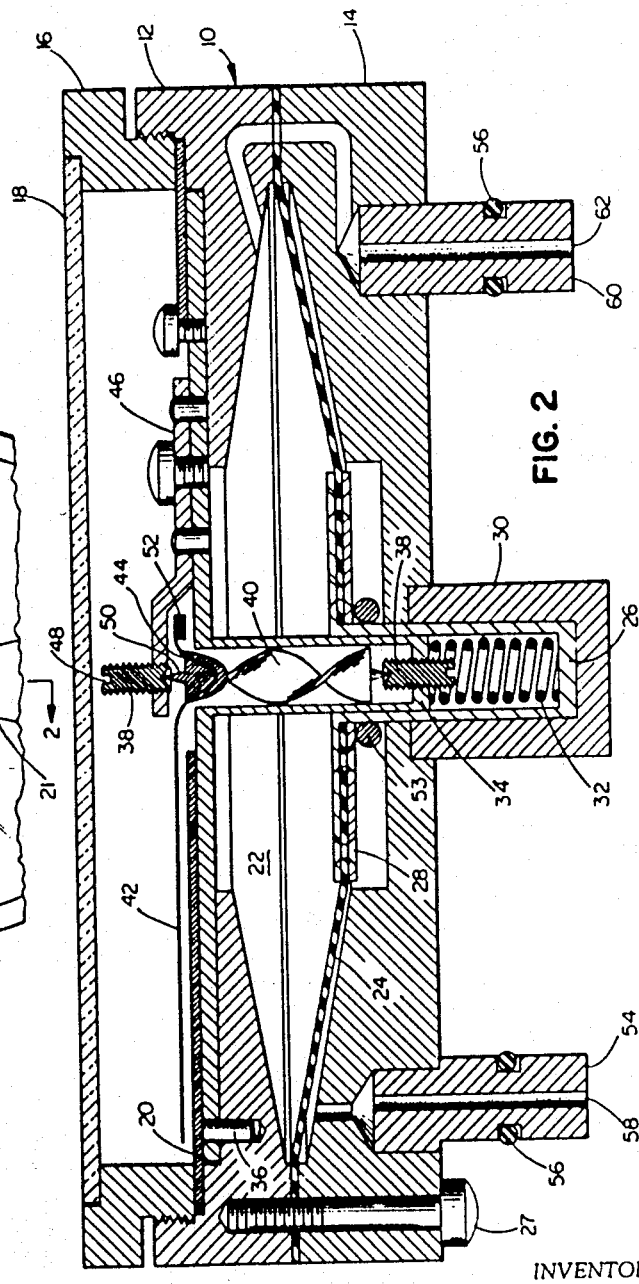
FIG. 2 is an enlarged cross sectional view taken through section 2—2 of FIG. 1.

Referring now to the drawing in detail, wherein like reference characters designate like or corresponding parts throughout the several views, there is shown in FIG. 2, a cross section of FIG. 1, which illustrates a preferred embodiment, a diaphragm housing 10 made up of two parts 12 and 14, the top and bottom respectively. Attached to the top portion 12 is a dial cover 16 having a clear Plexiglas face 18 glued to, or affixed thereto by some other means, wherein the Plexiglas allows easy reading of the dial face of the gage. Member 16 may be screwed to the top portion 12, or can be detached in any convenient manner, but should be easily removed in order to provide access to gage face 20 which is adjustable and interchangeable. Slot 21 provides the adjustment for the dial. Members 12 and 14, are shaped so as to form a chamber 22 between them for the reception of a diaphragm. Flexible diaphragm 24 which can be rubber, metal or the like is secured around its periphery between two parts of the housing and is disposed in chamber 22, preferably by bolting the two parts together as by bolts 27. It is understood however that the diaphragm may be secured in the housing by any convenient manner or means. Diaphragm 24 is mounted so that it is immediately adjacent to or in contact with the bottom member 14 of housing 10.

Diaphragm 24 has a member 26 attached thereto by rivets 28 or the like which depends below bottom 14 and into a thimble or cap member 30 which is attached to the bottom 14 in an air tight sealing arrangement. The function of member 26 and 30 being to act as a housing for spring 32 and a bearing surface, allowing the diaphragm to move smoothly in relation to pressure change and thereby provide an indication. Aligned in member 26 and in intimate contact with spring 32, is a second downwardly extending member 34 which is attached to the top 12 by pins 36 or the like. Member 34 which is a seal between chamber 22 and dial 20, also acts as a bearing surface for member 26, as a housing for jeweled pivot 38 and the rotatably mounted helix 40 to which there is attached an indicating pointer 42, it being preferred that the pointer project through a hole 44 in the helix, and be fixedly secured to the helix as by soldering. There is also a second jeweled pivot 38 attached centrally above member 34 which is held in place by bracket 46, the bracket being secured to member 34 by screws or the like. Jeweled pivots 38 comprise a threaded stud having an adjusting slot at one end and a jeweled bearing at the opposite end, and serve as a bearing surface for shaft 50 of helix 40 which is rotatably mounted between the jeweled pivots.

The indicating pointer, as is stated previously, is secured to helix 40 and is provided at one end with a coiled portion 52 which counter-balances the pointer. By providing such a construction, the pointer has low inertia and minimizes the load carried by jeweled pivots 38 and also allows the helix to be centrally balanced in member 34.

A U-shaped magnet 53 is secured to member 26 around member 34, and opposite the helix 40. As the pressure changes, the diaphragm and magnet move, wherein the helix will tend to rotate so as to maintain a constant and minimum air gap between the edges of the helix and the legs or poles of the magnet, thereby moving the pointer attached to the helix, and indicating a pressure change for a reading on the dial face.

Housing 10 is further provided with sockets 54 and 60 which have O-ring sealing means 56 thereon for connection to the source of pressure change to be measured. Socket 54 is connected by duct 58 to chamber 22 to apply pressure against the lower side of diaphragm 24. Another socket 60 is also formed in housing 10 for applying pressure via duct 62 to chamber 22 against the upper side of diaphragm 24.

In use, a source of low pressure is attached by a suitable connection to socket 60 and a source of a higher pressure is connected to socket 54. The pressure differential causes the diaphragm to move toward the upper portion of chamber 22 thereby lifting magnet 53 which in turn moves helix 40 and the pointer 42 attached thereto indicating a reading on dial 20. It has been found that the total diaphragm motion required to operate the pointer through its whole range can be made extremely small, this being dependent on the pitch imparted to helix 40 during its construction. If helix 40 is tightly wound then there will be a large needle movement, with a small diaphragm movement.

Obviously many modifications and variations of the present invention are possible in the light of the above teachings. It is therefore to be understood, that within the scope of the appended claims, the invention may be practiced otherwise than as specifically described.

What is claimed is:

1. A differential pressure responsive device which comprises:
   a housing,
   an upper and lower portion of said housing secured together in axial relationship defining a chamber within said housing,
   a flexible diaphragm separating said chamber in said housing into high and low pressure areas,
   a first cylindrical member open at the upper end and closed at the lower and and secured at the upper end thereof to said diaphragm coaxial with said housing and said diaphragm,
   means secured to the bottom of said housing coaxial therewith for receiving and guiding said cylindrical member in a direction axially of said housing,
   a second cylindrical member secured at the upper end thereof to the upper portion of said housing and extending downwardly into said first cylindrical member coaxial therewith,
   spring means confined within said first cylindrical member separating the inner surface of the bottom of said first cylindrical member from the lower surface of the bottom of said second cylindrical member,
   a helix in axial alignment with said housing and each of said cylindrical members rotatably secured within said second cylindrical member,
   a pressure indicating arm secured to the upper end of said helix and rotatable therewith,
   magnetic pole pieces secured on the diaphragm about said helix whereby said helix and said pressure indicating arm are rotated simultaneously as said magnetic pole pieces are moved axially with said diaphragm relative to said helix due to a pressure change on either side of said diaphragm, and
   pressure connection means having passages in said housing connecting with said low and high pressure areas in said chambers.

2. A differential pressure responsive device as claimed in claim 1, in which:
   said helix is rotatable between axially spaced bearing surfaces.

3. A differential pressure responsive device as claimed in claim 1, in which:
   said spring means is calibrated to transmit proper movement to said magnet due to a pressure differential between said high and low pressure areas.

References Cited by the Examiner

UNITED STATES PATENTS

| 1,652,941 | 12/1927 | Isaac | 73—407 |
| 2,509,644 | 5/1950 | Kinderman | 73—407 X |
| 2,722,837 | 11/1950 | Dwyer | 73—407 |
| 3,091,123 | 5/1963 | Locke | 73—407 |

LOUIS R. PRINCE, *Primary Examiner.*

D. O. WOODIEL, *Assistant Examiner.*